US008625304B2

(12) United States Patent
Shen et al.

(10) Patent No.: US 8,625,304 B2
(45) Date of Patent: Jan. 7, 2014

(54) SUPPORTING MECHANISM FOR ELECTRONIC DEVICE

(75) Inventors: Chi-Kuan Shen, New Taipei (TW);
Shih-Wen Chiang, New Taipei (TW);
Yen-Chi Tsai, New Taipei (TW);
Yung-Han Hsiao, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 204 days.

(21) Appl. No.: 13/197,904

(22) Filed: Aug. 4, 2011

(65) Prior Publication Data
US 2012/0162955 A1   Jun. 28, 2012

(30) Foreign Application Priority Data
Dec. 22, 2010   (TW) .............................. 99145249 A

(51) Int. Cl.
*G06F 1/16* (2006.01)
*H05K 5/00* (2006.01)
*H05K 7/00* (2006.01)
*H05K 7/02* (2006.01)
*H05K 7/04* (2006.01)
*A47F 5/00* (2006.01)
*A47F 7/00* (2006.01)
*F16M 11/00* (2006.01)
*F16M 13/00* (2006.01)

(52) U.S. Cl.
USPC ................ 361/809; 361/679.02; 361/679.55; 361/679.26; 361/810; 361/679.56; 361/807; 361/679.3; 248/122.1; 248/125.1; 248/917; 248/918; 248/919

(58) Field of Classification Search
USPC ............ 361/679.02, 679.21, 679.55, 679.26, 361/679.6, 810, 809, 807, 724, 679.22, 361/679.58, 679, 3, 679.56; 248/122.1, 248/125.1, 460, 176.1, 121, 441.1, 127, 248/917–919
See application file for complete search history.

(56) References Cited

U.S. PATENT DOCUMENTS

| 6,186,462 | B1 * | 2/2001 | Schechtel et al. | 248/371 |
| 7,320,451 | B2 * | 1/2008 | Ogawa | 248/161 |
| 2005/0061937 | A1 * | 3/2005 | Kim | 248/274.1 |
| 2010/0065702 | A1 * | 3/2010 | Hsu | 248/231.9 |

* cited by examiner

*Primary Examiner* — Anthony Haughton
*Assistant Examiner* — Zhengfu Feng
(74) *Attorney, Agent, or Firm* — Altis Law Group, Inc.

(57) ABSTRACT

A supporting mechanism for adjusting an angle of an electronic device, includes a retaining member and a supporting member slidably attached to the retaining member. The supporting member includes a first supporting end and a second supporting end opposite to the first supporting end. The first supporting end is located on a first side of the retaining member, and the second supporting end is located on a second side of the retaining member. The supporting member is slidable relative to the retaining member between a first position and a second position, the first supporting end supports the electronic device in a first position, the second supporting end supports the electronic device in a second position, and both the first and second supporting ends cooperatively support the electronic device in a third position.

5 Claims, 7 Drawing Sheets

SUPPORTING MECHANISM FOR ELECTRONIC DEVICE

BACKGROUND

1. Technical Field

The present disclosure relates to supporting mechanisms and more particularly to a supporting mechanism for an electronic device.

2. Description of Related Art

An electronic device such as an All-In-One computer comprising a host and a display integratedly formed, a tablet computer, or a personal digital assistant generally has viewing angles adjustable via a supporting mechanism. The typical supporting mechanism usually includes a locating member that requires many screws to selectively position the electronic device. The locating member has a complex structure, which increases the cost of the supporting mechanism, and makes it difficult and time consuming to adjust the angle of the display.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
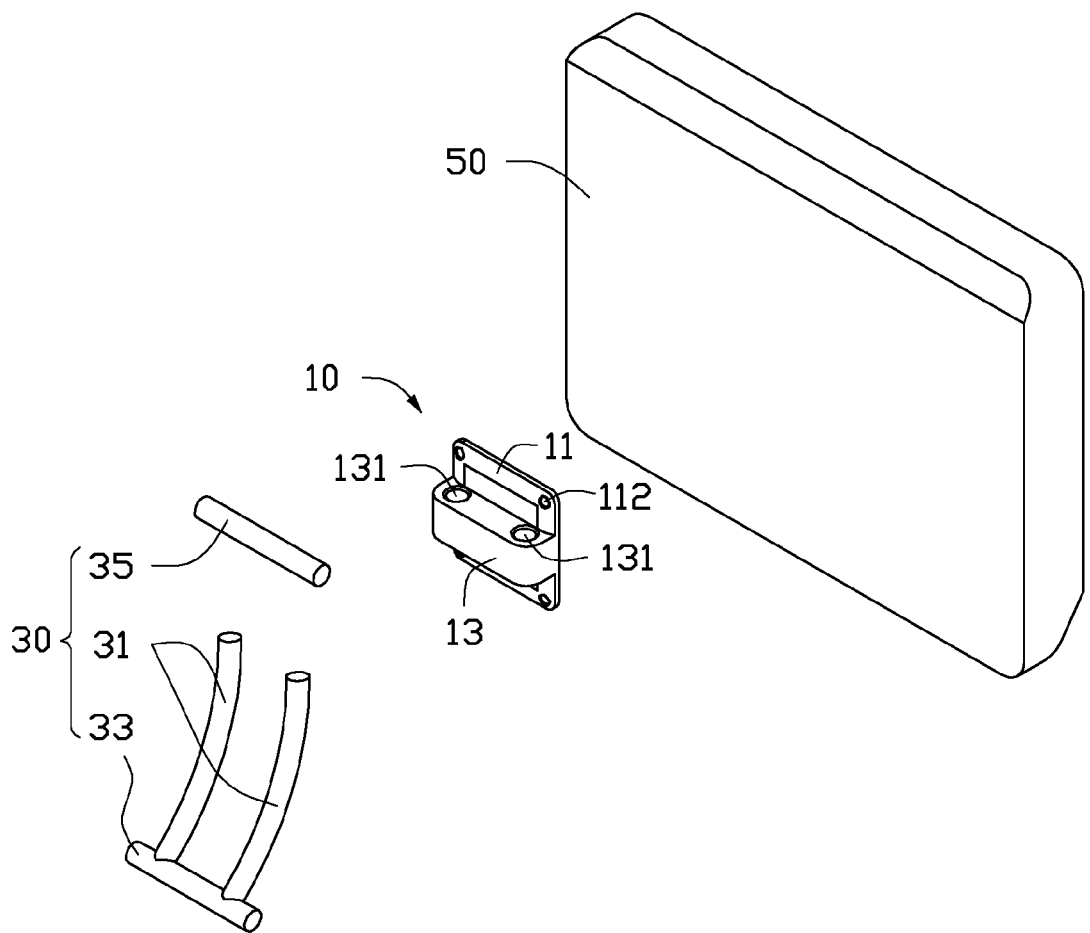
FIG. 1 is an exploded, isometric view of one embodiment of a supporting mechanism and an electronic device.

Referring to FIG. 1, one embodiment of a supporting mechanism includes a retaining member 10 and a supporting member 30 slidably attached to the retaining member 10. The supporting mechanism can support an electronic device 50. In one embodiment, the electronic device 50 with a touch screen or display may be an All-In-one, a tablet computer, or a personal digital assistant, or any structure needing support.

The retaining member 10 includes a securing board 11 and a retaining portion 13 attached to a surface of the securing board 11. Securing holes 112 are defined in the securing board 11. In the illustrated embodiment, four securing holes are defined at the four corners of the securing board 11. The retaining portion 13 defines at lease one through hole 131. In the illustrated embodiment, two through holes 131 are shown. In one embodiment, each through hole 131 is arcuate.

The supporting member 30 includes at least one sliding post 31, a first supporting end 33 attached to a first end of the at least one sliding post 31, and a second supporting end 35 attached to a second end of the at least one sliding post 31. In one embodiment, the first and second supporting ends 33, 35 are column rods attached to two substantially parallel sliding posts 31. The present disclosure is not limited to such a configuration and the positions thereof can be changed to allow movement of the first and second supporting ends 33, 35. In addition, the first and second supporting ends 33, 35 can be at least one securing member, such as a base, or a tray, which has a larger diameter or size than that of the at least one through hole 131 to prevent detachment of the at least one sliding post 31.

Each sliding post 31 can also be arcuate. A radius of the arc of the at least one sliding post 31 is substantially equal to that of each through hole 131, and a diameter of the at least one sliding post 31 is less than that of the at least one through hole 131, so that the at least one sliding post 31 can be slidably received in the at least one through hole 131. In one embodiment, the length of the at least one sliding post 31 is greater than that of the at least one through hole 131, so the first and second ends of the at least one sliding post 31 can extend out of the at least one through hole 131. The present disclosure is not limited to such a configuration and the position thereof can be changed to allow movement of the supporting member 30. For example, the length and the bend radius of the at least one sliding post 31 and the at least one through hole 131 can be adjusted according to the volume of the electronic device 50, and the first supporting end 33 or the second supporting end 35 can be adjusted to a positioning base to directly support the electronic device 50.

Figure 2:
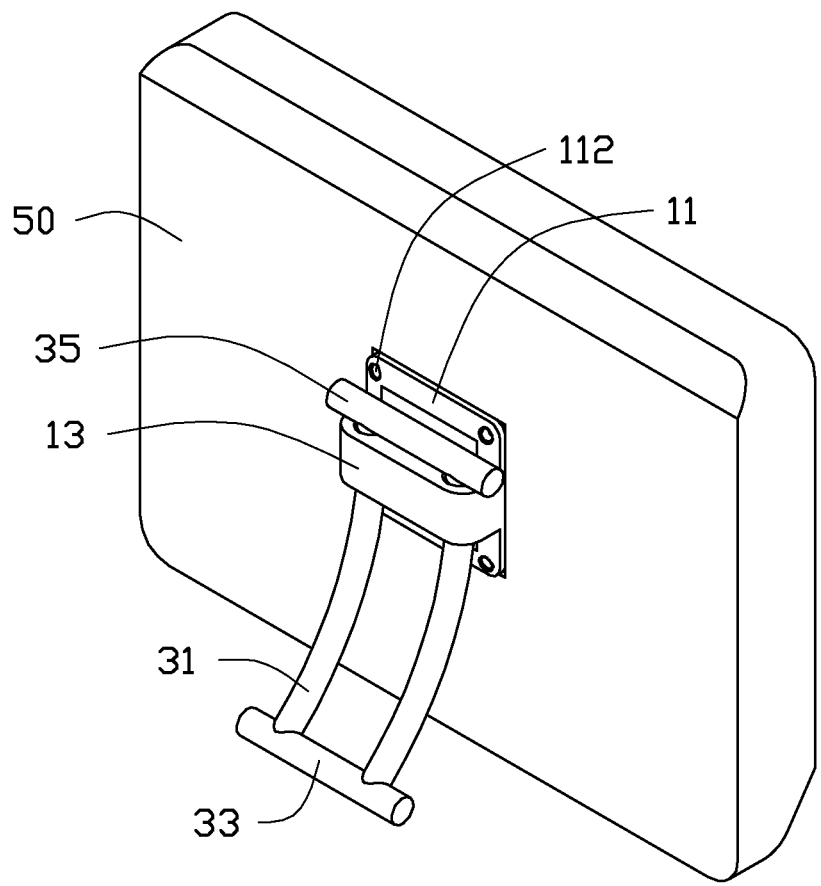
FIG. 2 is an assembled view of the supporting mechanism and the electronic device of FIG. 1.

Referring to FIG. 2, in assembly, the first supporting end 33 can be secured to the first end of the two sliding posts 31 by screws or other joining means. The two sliding posts 31 are passed through the two through holes 131, and the second supporting end 35 is secured to the second end of the two sliding posts 31 by screws or other joining means. Therefore, the first supporting end 33 is located on a first side of the retaining portion 13, and the second supporting end 35 is located on an opposite second side of the retaining portion 13.

Figure 3:
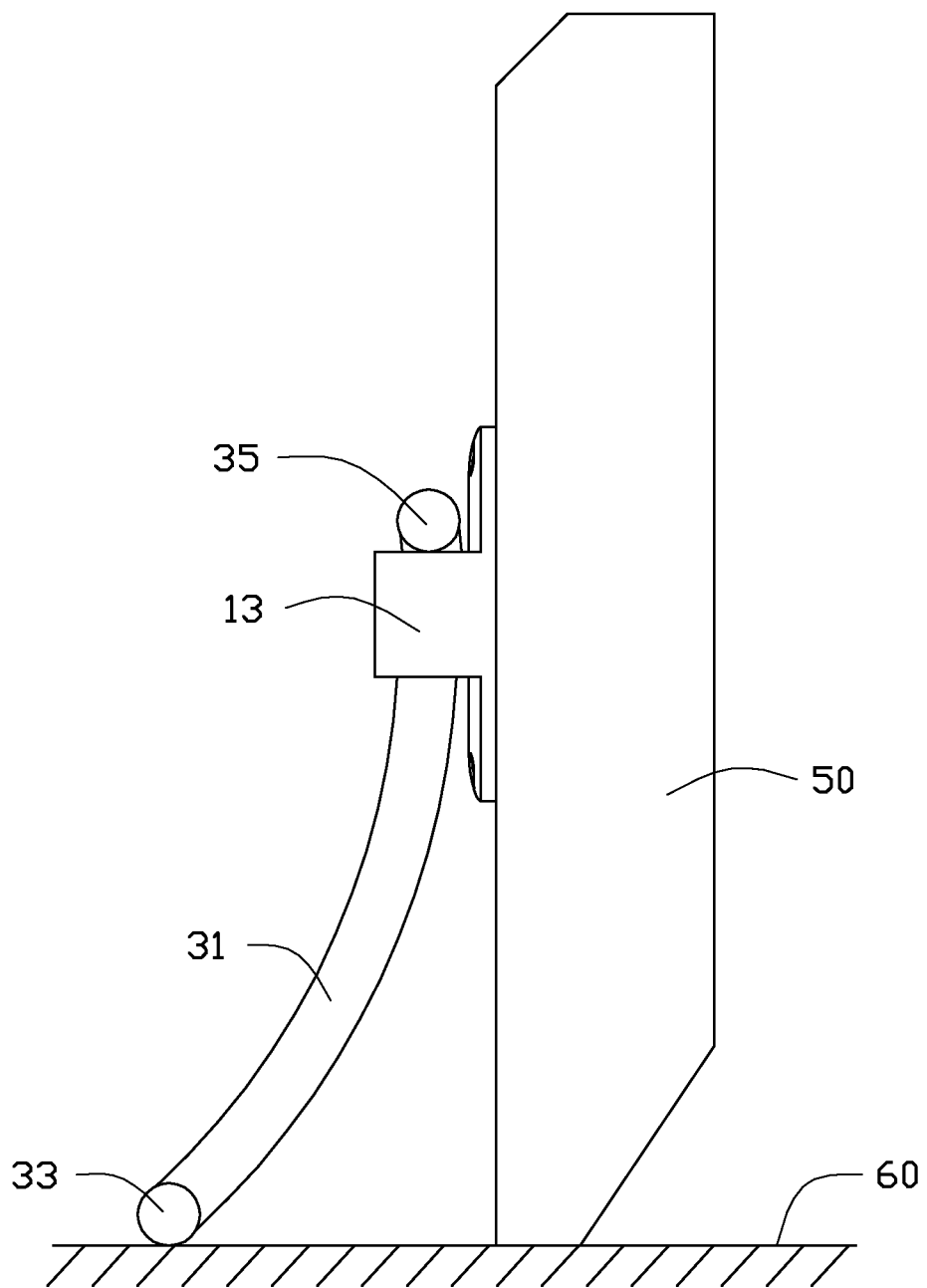
FIG. 3 is a side view of the supporting mechanism and the electronic device of FIG. 2 shown in a first position supported on a supporting surface.
Figure 4:
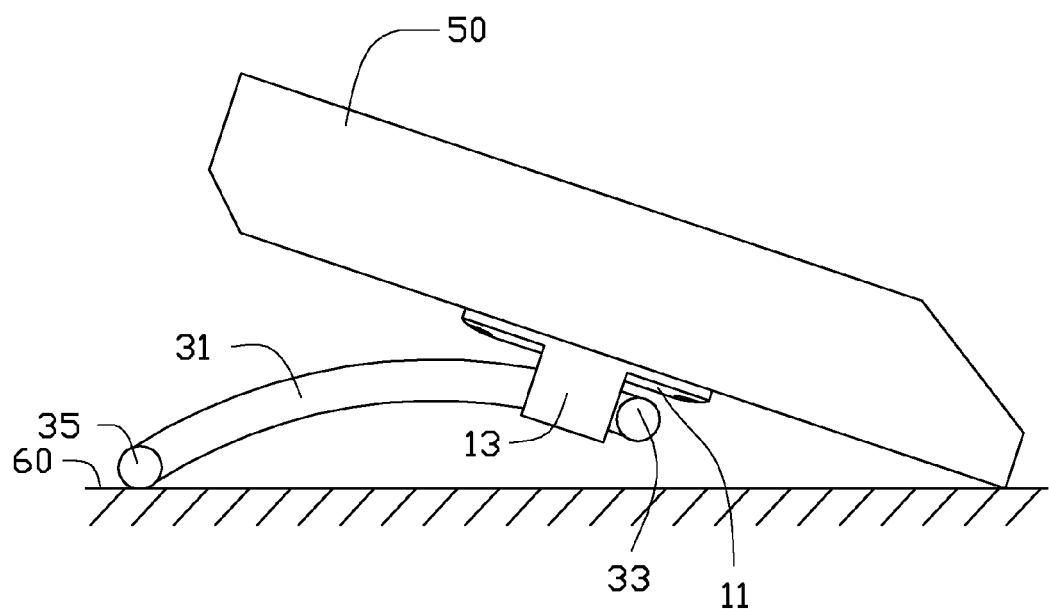
FIG. 4 is similar to FIG. 3, but shown in a second position.
Figure 5:
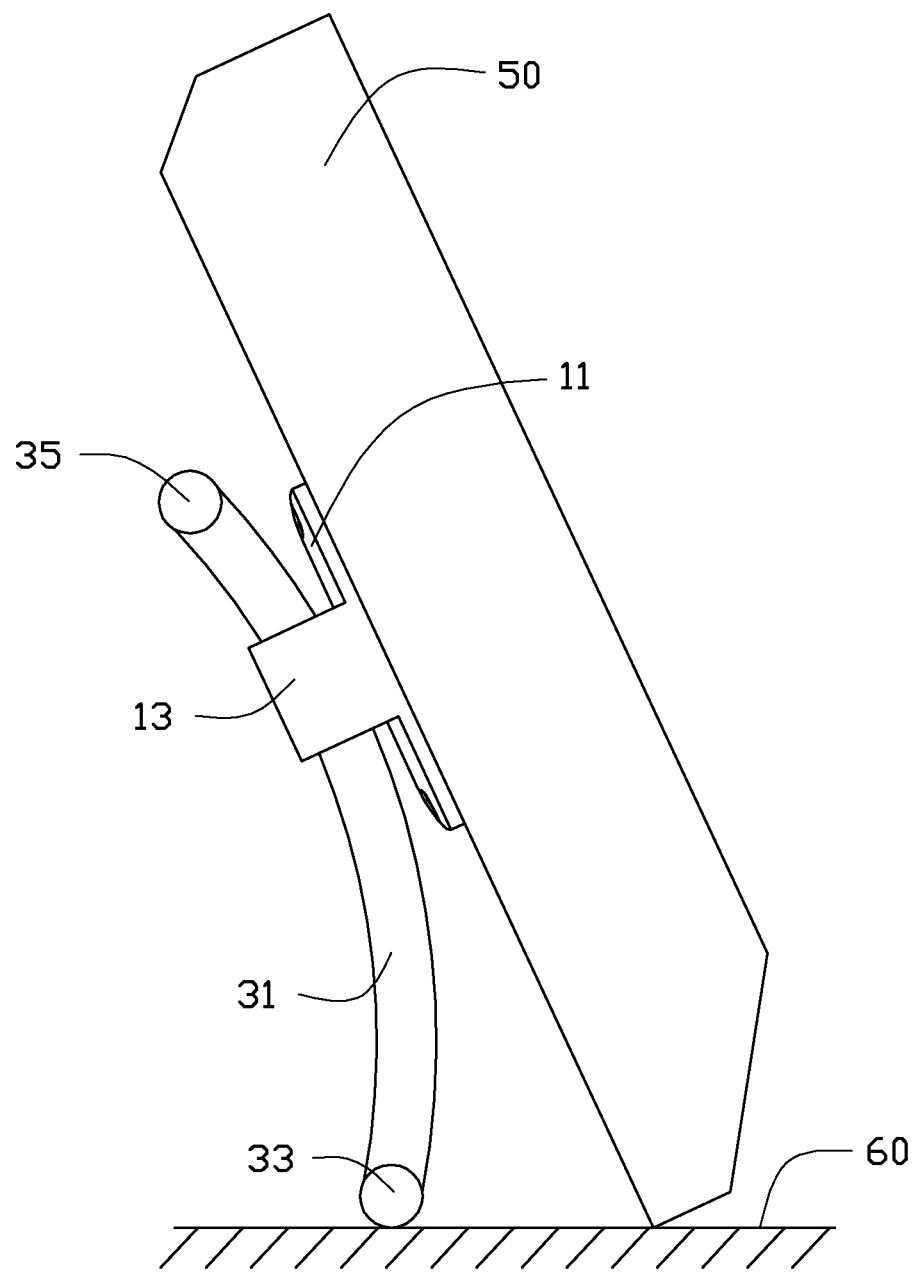
FIG. 5 is similar to FIG. 3, but shown in another position.
Figure 6:
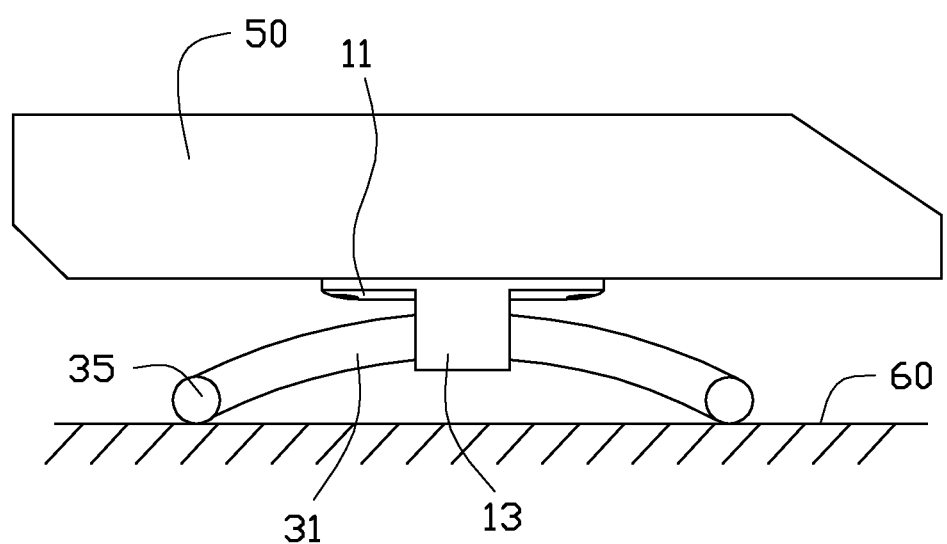
FIG. 6 is similar to FIG. 3, but shown in a third position.

Referring to FIGS. 3-6, the supporting member 30 is rotatable relative to the retaining member 10 between a first position and a second position, to position the electronic device 50 in any position between the first and second positions. In one embodiment, a friction piece (not shown) is attached to an inner surface of each through hole 131 to increase friction. Therefore, when the sliding posts 31 are slid to any position, the sliding posts 31 can be positioned via the friction piece. Referring to FIGS. 3 and 4, in the first and second positions, one of the first and second supporting ends 33, 35 lays on a supporting surface 60 and supports the electronic device 50. Referring to FIG. 6, the first and second supporting ends 33, 35 both lay on the supporting surface 60 and support the electronic device 50.

Referring to FIG. 3, when the first supporting end 33 lays on the supporting surface 60 and supports the electronic device 50, the second supporting end 35 abuts the retaining portion 13, and the securing board 11 and the electronic device 50 are both substantially perpendicular to the supporting surface 60. Referring to FIG. 4, when the second supporting end 35 lays on the supporting surface 60 and supports the electronic device 50, the first supporting end 33 abuts the retaining portion 13, and the electronic device 50 with the securing board 11, and the supporting surface 60 cooperatively define an acute angle. In one embodiment, the acute angle is 30°. Therefore the electronic device 50 can be conveniently utilized in a variety of viewing angles simply by sliding the at least one sliding post 31 through the at least one through hole 131.

Referring to FIG. 5, the electronic device 50 is shown in a position between the first and second position, accomplished by sliding the sliding posts 31 relative to the retaining portion 13. The first supporting end 33 is moved towards the retaining portion 131, and the second supporting end 35 is moved away from the retaining portion 131. The securing board 11, attached to the electronic device 50, and the supporting surface 60 can cooperatively define a comfortable angle, such as 75°.

Referring to FIG. 6, the sliding posts 31 are slid to a position in which the first and second supporting ends 33, 35 simultaneously lay on the supporting surface 60 and support the electronic device 50. A center portion of each sliding post 31 engages with the retaining portion 13, a distance between the first supporting end 33 and the retaining member 10 is substantially equal to that of the second supporting end 35 and the retaining member 10, and the electronic device 50 is substantially parallel to the supporting surface 60.

Figure 7:
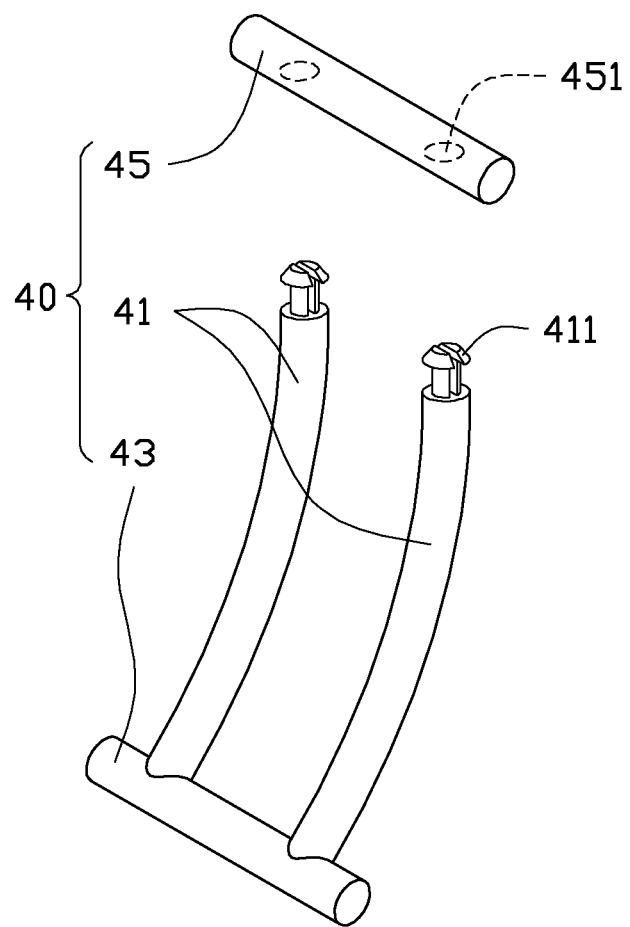
FIG. 7 is an exploded, isometric view of one embodiment of a supporting member of the supporting mechanism.

Referring to FIG. 7, another embodiment of the supporting member 40 includes two sliding posts 41, a first supporting end 43 attached to a first end of each sliding post 41, and a second supporting end 45 attached to a second end of each sliding post 41. Each sliding post 41 has a hook 411 and a plurality of clipping holes 451 (only two shown) defined in the second supporting end 45 and corresponding to the hooks 411. The two sliding posts 41 can be passed through the two through holes 131 and engage into the two clipping holes 451 to secure the supporting member 40 to the retaining member 10.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A supporting mechanism for an electronic device, the supporting mechanism comprising:
   a retaining member attached to the electronic device; and
   a supporting member slidably attached to the retaining member, the supporting member comprising at least one sliding post, a first supporting end, and a second supporting end; the at least one sliding post extending through the retaining member; the first supporting end attached to a first end of the at least one sliding post and located on a first side of the retaining member; and the second supporting end attached to a second end of the at least one sliding post and located on a second side of the retaining member opposite to the first side;
   wherein the supporting member is slidable relative to the retaining member between a first position and a second position; the first supporting end abuts a supporting surface and supports the electronic device in the first position, the second supporting end abuts the supporting surface and supports the electronic device in the second position, and both the first and second supporting ends cooperatively abut the supporting surface and support the electronic device in a third position;
   the at least one sliding post comprises two sliding posts substantially parallel to each other; two through holes are defined in the retaining member, and the two sliding posts are slidably received in the two through holes; and the at least one sliding post is arcuate, each through hole is arcuate, and a bend radius of the through hole is substantially equal to that of each sliding post.

2. The supporting mechanism of claim 1, wherein the first supporting end is a column rod connected to the first end of each sliding post, and the second supporting end is a column rod connected to the second end of each sliding post.

3. A supporting mechanism for an electronic device, the supporting mechanism comprising:
   a retaining member attached to the electronic device and defining at least one through hole; and
   a supporting member slidably attached to the retaining member, the supporting member comprising at least one sliding post, a first supporting end, and a second supporting end, the first supporting end connected to a first end of the at least one sliding post, and the second supporting end connected to a second end of the at least one sliding post; the at least one sliding post extending through the at least one through hole and slidably received in the at least one through hole, the first supporting end laying on a supporting surface, the second supporting end abutting the retaining member;
   wherein the at least one sliding post is slidable relative to the retaining members a first distance between the first supporting end and a first side of the retaining member is adjustable to adjust a second distance between the first supporting end and a second opposite side of the retaining member, and when the first distance between the first supporting end and the retaining member becomes less, the second distance between the second supporting end and the retaining member becomes greater;
   the at least one sliding post comprises two sliding posts, and the two sliding posts are substantially parallel to each other; the first supporting end is a column rod and, the second supporting end is a column rod and defines two clipping holes, and each sliding post comprises two hooks engaged in the two clipping holes.

4. A supporting mechanism for an electronic device, the supporting mechanism comprising:
   a retaining member attached to the electronic device and defining a through hole; and
   a supporting member slidably attached to the retaining member, the supporting member comprising at least one sliding post, a first supporting end, and a second supporting end; the at least one sliding post slidably extending through the through hole, the first supporting end connected to a first end of the at least one sliding post, and the second supporting end connected to a second end of the at least one sliding post;
   wherein the at least one sliding post is arcuate, the at least one through hole is arcuate, and a bend radius of the at least one through hole is substantially equal to that of at least one sliding post.

5. The supporting mechanism of claim 4, wherein the first supporting end is a column rod and, the second supporting end is a column rod and defines two clipping holes, and each sliding post comprises two hooks engaged in the two clipping holes.

* * * * *